Aug. 25, 1959  K. RABE ET AL  2,901,052
TRACTOR ENGINE COOLING AND EXHAUST SYSTEM
Filed Nov. 16, 1954  2 Sheets-Sheet 1
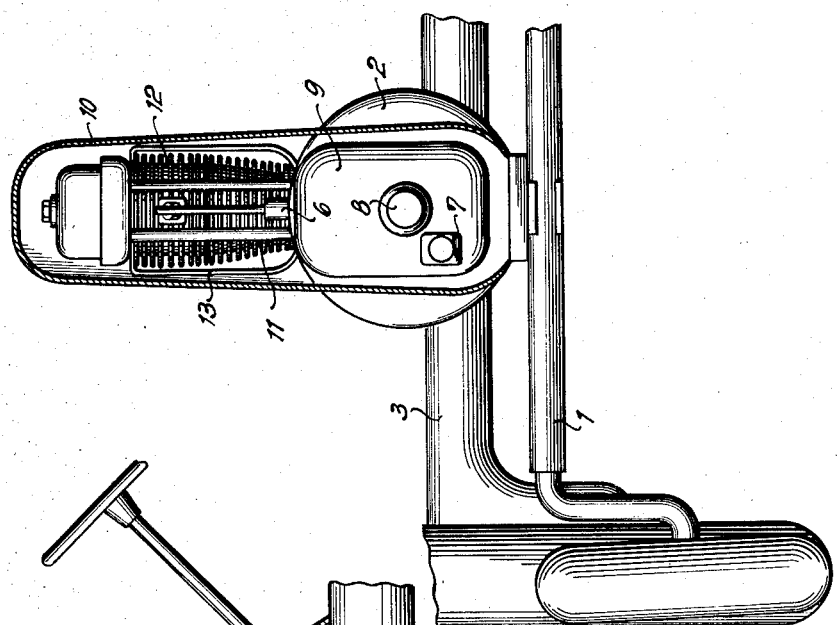
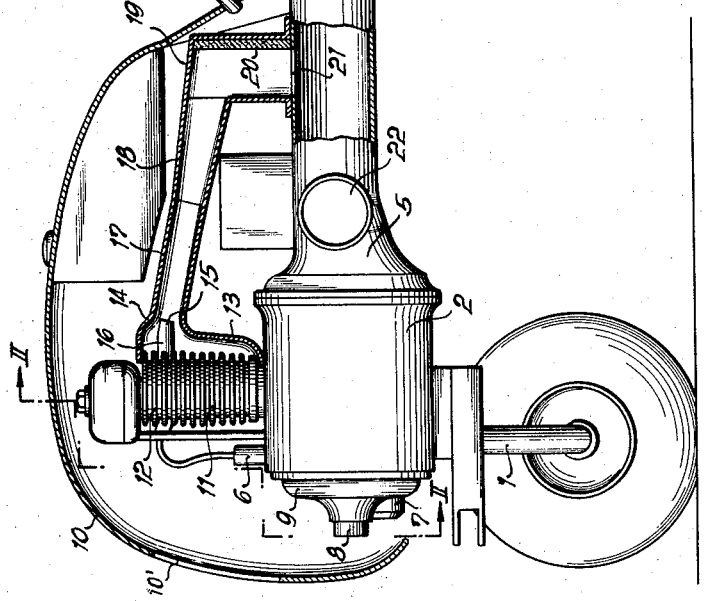
INVENTORS
Karl Rabe
Egon Forstner
By Pennie, Edmonds, Morton, Barrows & Taylor
Attorneys Aug. 25, 1959  K. RABE ET AL  2,901,052
TRACTOR ENGINE COOLING AND EXHAUST SYSTEM
Filed Nov. 16, 1954  2 Sheets-Sheet 2

INVENTORS
Karl Rabe
Egon Forstner
By
Pennie, Edmonds, Morton, Barrows & Taylor
Attorneys

2,901,052

TRACTOR ENGINE COOLING AND EXHAUST SYSTEM

Karl Rabe, Korntal, Wuerttemberg, and Egon Forstner, Stuttgart-Degerloch, Germany, assignors to Dr. Ing. h.c.F. Porsche K.-G., Stuttgart-Zuffenhausen, Germany Application November 16, 1954, Serial No. 469,246

Claims priority, application Germany December 28, 1953

1 Claim. (Cl. 180—54)

This invention relates to improvements in tractors, especially for agricultural purposes, such as the cultivation of row crops. The width of the superstructures of tractors provided either with air-cooled engines or water-cooled engines is largely determined by the radiator and fan and the air-cooling mechanism, respectively, and the other auxiliary units driven by the engine. Accordingly, the width of the cowling for such tractors bears a very unfavorable ratio with respect to the size of the other parts of the gasoline engine, especially the cylinder or cylinders. When such tractors are used for cultivating row crops, that is, in working the fields with cultivators, there is a further drawback in that the plants for a certain length of time when they are relatively large, are bent down by the tractor superstructure and in many instances are broken off. The resulting losses suffered under such conditions cannot be sustained by agriculture and are not offset by the advantages resulting from the attendant cultivation of the crops.

The primary object of the invention is, therefore, to provide an agricultural tractor having a very narrow superstructure so that the drawbacks referred to above are avoided.

A further object of the invention is to provide a tractor having a superstructure narrowed to such an extent that the driving of the tractor through row crops is improved.

The foregoing drawbacks are overcome and the objects attained according to the invention by providing a tractor with a relatively narrow engine block, locating the auxiliary engine units, such as the generator, power lift pump and fuel injection pump at the front of the motor block so that they do not extend materially beyond the side outline of the motor block, and providing an ejector mechanism extending behind the cylinder for supplying cooling air for cooling the engine.

The arrangement of the parts of the engine in this manner results in a very narrow superstructure for the tractor, the width of which corresponds essentially to that of the engine cylinder. At the same time the structural parts usually provided on tractors for the cooling fan including bearings, driving means, housing and air lines are omitted, thereby reducing the cost of the tractor. A tractor of the type described can go through rows of plants without bending them down with the superstructure of the tractor. Furthermore, the view of the driver is improved because he is not required to lean out to one side or the other and look around a wide superstructure in order to control the tractor or the cultivating devices propelled thereby.

The improved tractor construction includes a chassis provided with a flow-reversing or sound muffling chamber into which the waste gases from the ejector flow and strike several baffling plates equipped with muffling or sound proofing means, and which at the same time provide for reversal of flow of the gas current.

In a preferred construction parts of the ejector installation, particularly the reversal or muffling chamber are formed of or included in structural parts already available in the tractor, such as the chassis and superstructure. For example, in a tractor in which the motor block is located within the range of the front axle and the driving block is located within the range of the rear axle and they are connected with one another by a central tube of the tractor frame, this central tube is made use of for forming the reversing or muffling chamber. By using this central frame tube, which is preferably made of cast iron, the muffling of the sound coming from the ejector installation is considerably improved without any additional structural parts. The tube frame may at the same time comprise the conduit for delivering the exhaust gases from the reversing or muffling chamber into the atmosphere.

Other features and advantages will be apparent from the following more detailed description taken in connection with the accompanying drawings which show an exemplary embodiment of a tractor constructed according to the invention.

In the drawings:

Fig. 1 is a broken side elevational view of the front end of a tractor constructed according to the invention, partly in section;

Fig. 2 is a front view partly in section taken on the line II—II of Fig. 1; and

Figure 3:
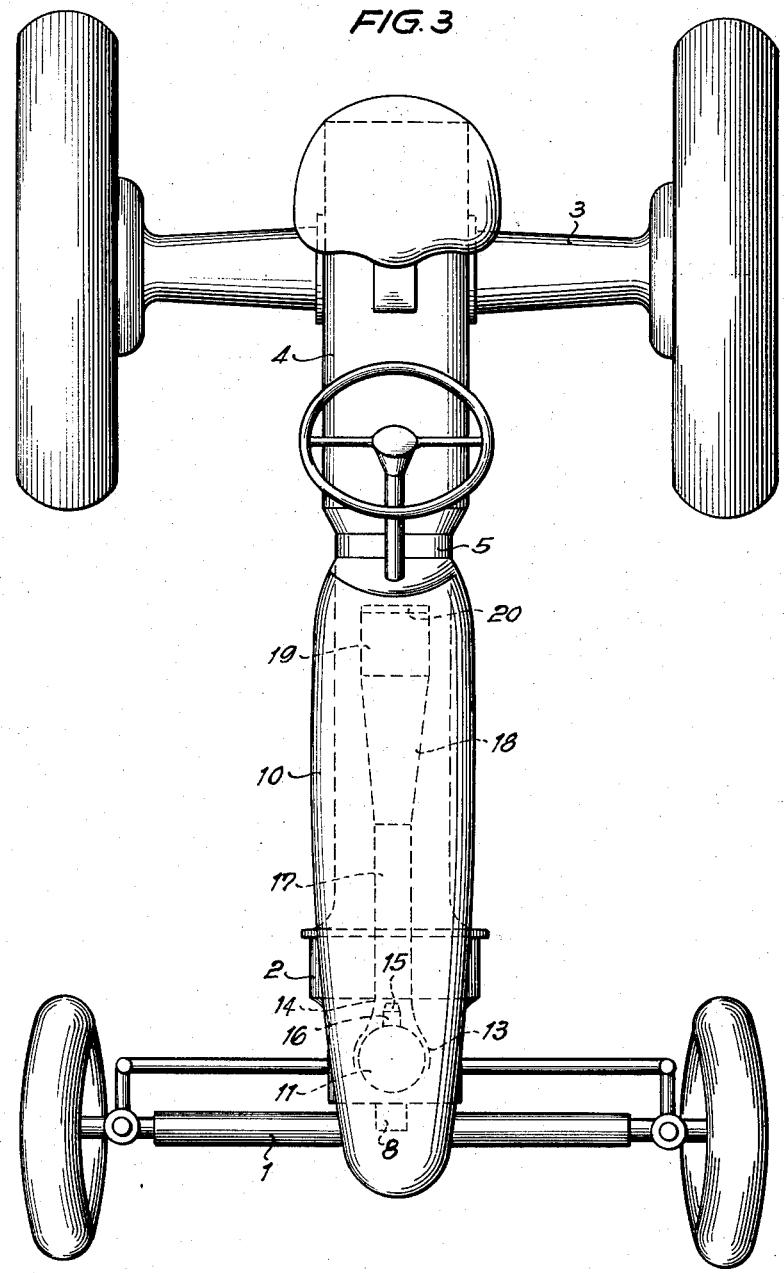
Fig. 3 is a plan view of the tractor.

Referring to the drawings which are more or less diagramamtic views of a tractor provided with a one cylinder gasoline engine, although, of course, the engine may include several cylinders preferably arranged in series or in a row one behind the other, the tractor includes an engine block 2 arranged and supported within the range of the front axle 1, and a driving block 4 arranged on top of a rear axle 3. These driving units 2 and 4 are connected with one another by a central frame tube 5, through which a drive shaft, not shown, extends.

The auxiliary units or mechanisms driven by the gasoline engine, for example, a fuel injection pump 6, a power lift pump 7 and a generator 8 are located at the front of the engine at the positions shown in Figs. 1 and 2, at the steering gear cover 9, in such a manner that they do not extend beyond the side outline of the motor block proper. When the auxiliary units are arranged in this manner, they no longer determine the width of the superstructure and such superstructure is not determined by a cooling fan, but the cowling 10 can be adapted to substantially the width of the engine cylinder. The improved construction is not completed by the use of a fan for cooling the air-cooled cylinder but by supplying cooling air to the cylinder by means of an exhaust ejector. The cowling 10 is provided with slots or openings 10' directly in front of the engine cylinder so that cooling air may be drawn directly thereonto.

The engine includes an air-cooled cylinder 11 and an air-cooled cylinder head 12, which, on the side facing the exhaust, that is, to the rear, are enclosed in a known manner by air conducting sheets 13. These air guided sheets 13 terminate to the rear of the cylinder 11, on its exhaust side in a short tube section 14 formed similar to a suction tube into which the exhaust nozzle 15 of the exhaust pipe 16 of the engine discharges. The exhaust gases discharged through the driving nozzle 15 by their ejector action cause cooling air to be sucked through the gasoline engine, for example, over the cylinder 11 and cylinder head 12. The exhaust gases, together with the heated cooling air, flow through a mixing tube 17 and a diffuser 18 into a flow-reversing or muffling chamber 19. The chamber 19 is connected with the interior of the frame tube 5 by an opening 21 and is equipped with a muffling or sound proofing material 20 located on its rear wall opposite the outlet of the diffuser 18. The gas current coming from the diffuser engages the sound muffling material 20 in the chamber 19, as a result of which a large part of the unpleasant high frequency oscillations of the gas column is absorbed by the sound muffling material. At the same time a reversal in the flow of the gas current takes place.

In order to accommodate the sound muffling installation or unit in the tractor with as little extra space as possible and without thereby interfering with the effectiveness of the installation, the frame tube 5 may be made use of as a sound-muffling and flow-reversing chamber, such as the chamber 19. Accordingly, the tube 5 adjacent to the chamber 19 is provided with the hole 21 through which the current of gases after reversing flow in chamber 19 is delivered into the tube 5. The preferably cast iron frame tube 5 causes an additional damping of the sound of the gases and, since it is provided with a hole 22, substantially spaced from the hole 21, it serves to reverse the gas flow and to lead the current of gases from the damping chamber 19 to the atmosphere.

Certain details of the sound dampening means disclosed in the present application are disclosed and claimed in the applicants' application Ser. No. 473,610, filed December 7, 1954, now abandoned.

What we claim is:

In a tractor particularly for cultivating row crops including front and rear axles, an internal combustion engine having at least one air cooled cylinder located adjacent the front axle of the tractor, a central longitudinally extending frame tube connecting the front and rear axles, and means for drawing cooling air over the engine cylinder including an engine exhaust ejector installation located behind the engine cylinder above the frame tube and directed rearwardly in the longitudinal direction of the tractor, the improvement comprising a tubular member one end of which is connected into the outlet of the exhaust ejector installation, said tubular member extending rearwardly from the ejector along and above the frame tube, and a sound-muffling chamber located above the frame tube having a connection with the other end of the tubular member for the flow of exhaust gases and air and a connection with the frame tube at a point rearwardly of the exhaust ejector installation for the flow of exhaust gases and air, said frame tube having an outlet for engine exhaust gases and air located in an offset position forwardly with respect to said point, the arrangement being such that the engine exhaust gases and air flow rearwardly from the exhaust ejector installation through the tubular member into the sound-muffling chamber then downwardly into the frame tube and forwardly in the frame tube to its outlet.

References Cited in the file of this patent

UNITED STATES PATENTS

| | | |
|---|---|---|
| 862,250 | Herman | Aug. 6, 1907 |
| 1,560,351 | Seidel | Nov. 3, 1925 |
| 2,091,496 | Treen | Aug. 31, 1937 |
| 2,187,425 | Johnston | Jan. 16, 1940 |
| 2,390,218 | Lamb | Dec. 4, 1945 |
| 2,701,024 | Thomas | Feb. 1, 1955 |
| 2,702,438 | Ballu | Feb. 22, 1955 |

FOREIGN PATENTS

| | | |
|---|---|---|
| 882,040 | Germany | July 6, 1953 |
| 17,088 | Great Britain | 1914 |
| 479,938 | Italy | Apr. 17, 1953 |
| 138,414 | Sweden | Dec. 9, 1952 |